US005767868A

United States Patent [19]

Sugiuchi et al.

[11] Patent Number: 5,767,868

[45] Date of Patent: Jun. 16, 1998

[54] METHOD FOR ESTABLISHING A USER IDENTIFICATION CODE AND A JOB CLASSIFICATION CODE ON A TIME CARD

[75] Inventors: Shuji Sugiuchi; Mituru Saito; Youichi Konno; Kenji Ebine; Kenji Maejima, all of Yokohama, Japan

[73] Assignee: Amano Corporation, Kanagawa-ken, Japan

[21] Appl. No.: 359,735

[22] Filed: Dec. 20, 1994

[51] Int. Cl.$^6$ .......................... G01D 15/04; G01D 15/20

[52] U.S. Cl. .......................... 346/82

[58] Field of Search .......................... 346/82; 355/69; 371/40.4, 37.4; 327/261; 356/443; 365/233; 368/40

[56] References Cited

U.S. PATENT DOCUMENTS 3,626,380 12/1971 Griffin .......................... 346/82
3,796,491 3/1974 McIntosh et al. .......................... 355/69
5,479,418 12/1995 Hughes-Hartogs .......................... 371/40.4

*Primary Examiner*—N. Le
*Assistant Examiner*—Raquel Yvette Gordon
*Attorney, Agent, or Firm*—Stevens, Davis, Miller & Mosher, L.L.P.

[57] ABSTRACT

A method for establishing a code on a time card includes the step of selecting that day, among numerical figures representing dates printed in a date column on the time card, which is equal to an ID code number of a card user, and the step of applying a code read mark in the day indication column, thereby forming the ID code of the card user on the time card. A time recorder equipped with a code judgment function is also disclosed.

3 Claims, 9 Drawing Sheets

| | JOB CLASSIFICATION |
|---|---|
| NO MARK IN EMPTY COLUMN | REGULAR EMPLOYEE |
| MARK EXISTS IN EMPTY COLUMN | PART TIME WORKER |
| MARK EXISTS IN 31-DAY COLUMN | SHIFT 1 |
| NO MARK IN 31-DAY COLUMN | SHIFT 2 |

METHOD FOR ESTABLISHING A USER IDENTIFICATION CODE AND A JOB CLASSIFICATION CODE ON A TIME CARD

BACKGROUND OF THE INVENTION

1. Field of the Invention

The present invention is utilized in the technical field of a time record which is suitable to be used in companies, offices, or the like which have a comparatively small number (about thirty) of workers, and more particularly, it relates to a method for establishing a code on a time card, in which an ID code and a job classification of a card user can be established on the time card in a very simple manner, and a time recorder equipped with a function for judging such established code by reading the code from the time card.

2. Brief Description of the Prior Art

Typically, there are two types of conventional time cards; in the first type as shown in FIG. 1O(A), for example, an exclusive code preparing column PT used for forming therein an ID code of a card user (employee code) and a job classification code is formed at a lower side of the time card so that various codes can be formed in this code preparing column PT by punching or marking, and in the second type as shown in FIG. 10(B), for example, code preparing columns Na and Nb for forming "−" digit and "+" digit formed at opposite sides of a lower part of the time card TN so that various codes can be prepared in those code preparing columns Na and Nb by punching or marking.

However, in either type of the time cards TM and TN, since the exclusive code preparing column PT or columns Na and Nb used for preparing various codes are required, the small spaces on the times cards TN and TM are occupied by the code preparing column PT or columns Na and Nb leaving only limited spaces for printing job data.

Also, in the case where a code is prepared by punching, since an exclusive punching machine for punching the code preparing column PT or columns Na and Nb is required, the work for preparing the cards is troublesome and the cost for preparing each card is high.

SUMMARY OF THE INVENTION

It is, therefore, an object of the present invention to provide an exclusive time recorder in which various codes can be very easily prepared utilizing a date column originally formed on each time card and without the need of a provision of a code preparing column used exclusively for preparing a code on the time card, so that an effective area on the time card can be widened as much as possible, and various codes prepared in the date column on the time card can be judged by reading the codes.

In order to resolve the above-mentioned technical problems, the present invention employs the following means.

(1) Among numerical figures representing dates printed in a date column on the time card, that day, which is equal to an ID code number of a card user, is selected and then, a code read mark is applied in the day indication column, thereby forming the ID code of the card user on the time card.

(2) An empty column or a particular day indication column preliminarily formed in a date column on the time card is served as a column in which an identification mark is to be formed, and a job classification code of a card user is determined depending on whether or not an identification mark is formed in the identification mark preparing column.

(3) The time recorder according to the present invention comprises mark read means for reading a mark which is entered in a day indication column on a time card inserted, date determination means for dividing a numerical figure representing a date with reference to the position where the mark, read by the read means, is located, identification mark judgment means for judging whether or not an identification mark exists in an empty column formed in a date column or a particular day indication column, and code determination means for determining an ID code and a job classification of a card user in accordance with the result of judgments made by the respective judgment means.

(4) The time recorder according to the present invention further comprises time card type determination means for determining the type of a time card which is different in accordance with a card closing day, top-surface/back-surface judgment means for judging a top-surface/back-surface of a time card inserted, the division of a numerical figure representing a date, made by the date judgment means, and the judgment as to whether or not the identification mark exits, made by the identification mark judgment means, being made in accordance with the result of determination made by the time card type determination means and with the result of judgment made by the top-surface/back-surface judgment means.

(5) The type of time card determination means comprises a closing date selection switch which is disposed in the time recorder.

(6) The type of time card determination means comprises a sensor for determining the type of a time card by reading a card type code which is formed on the time card.

The above-mentioned various means employed in the present invention function as follows.

According to the means mentioned in the above (1), if, among 30 days excepting the day 31 among numerical figures representing dates of 1 to 31 printed in a date column on both sides of the time card, that day, which is equal to an ID code number of a card user, is selected and then, a mark is applied in the day indication column by marking in black, punching or cutting, ID codes for thirty card users can be prepared on the respective users'time cards. Accordingly, it is no more necessary to prepare a code preparing column used exclusively for preparing a code on a time card, and an effective area on the time card can be extensively widened to that extent.

According to the means mentioned in the above (2), since an empty column or a particular day indication column, i.e., day 31, which is preliminarily formed in a date column on the time card, is served as a column in which an identification mark is to be prepared, if, for example, it is preliminarily established that a time card having a mark in each preparing column is for a part time worker and a time card having no mark is for a regular employee, a job classification of the card user can be determined depending on whether or not an identification mark is formed in the identification mark preparing column. Accordingly, it is no more necessary to prepare a code preparing column used for preparing a code of job classification on the time card, and an effective area on the time card can be widened to that extent.

According to the means mentioned in the above (3), when the mark read means reads a mark from the day indication column on a time card inserted, the date determination means divides a numerical figure representing a date to determine the ID code of the card user, and when the identification mark judgment means makes a judgment as to whether or not an identification mark exists, the job classification of the card user is determined or established. Accordingly, job data of the card user is calculated in accordance with the ID code and job classification, and such calculated job data can be printed on the time card and filed in a memory of each workpeople.

According to the means mentioned in the above (4), although the position of the numerical figure representing the date of each date column is different depending on difference in closing day and on difference in inserting posture of the time card, i.e., whether the time card is inserted with the top-surface/back-surface facing the front, this difference can be specified by the time card type determination means and the top-surface/back-surface judgment means. Accordingly, in accordance with such specified mode, the division of the numerical figure representing a date, made by the date judgment means, and the judgment as to whether or not the identification mark exits, made by the identification mark judgment means, can be carried out without any trouble, thus enabling to make a judgment of the ID code and job classification of the card user.

According to the means mentioned in the above (5), if the closing day of the card is determined by the closing day selection switch, the judgment of the IC code of the card user and the judgment of the job classification of the card user are thereafter made based on such determined closing day, and in the case where a time card having a different closing day is used, the judgment of the ID code and the judgment of the job classification can be carried out without any trouble by switching this selection switch.

According to the means mentioned in the above (6), the sensor reads the identification code formed in the time card in order to automatically judge the type of the time card, and the judgment of the ID code and the judgment of the job classification are carried out in accordance with the mode of the identification code thus read. Accordingly, a plurality of time cards having different card closing days can be processed by a single time recorder without any trouble.

As seen from the foregoing, the previously mentioned technical problems inherent in the prior art devices can be resolved by the above-mentioned means.

The foregoing has outlined the more pertinent object of the present invention. That object should be construed as being merely illustrative of some of the more prominent features and applications of the invention. Many other beneficial results can be obtained by applying the disclosed invention in a different manner or modifying the invention within the scope of the invention. Accordingly, other objects in a full understanding of the invention may be had by referring to the detailed description describing the preferred embodiment in addition to the scope of the invention defined by the claims taken in conjunction with the accompanying drawings.

DETAILED DESCRIPTION OF THE EMBODIMENTS

Preferred embodiments of a method for establishing a code on a time card and a time recorder equipped with a function for judging such established code, according to the present invention, will be described in detail with reference to the accompanying drawings. It should be noted, however, that the preferred embodiments herein described are not intended to be exhaustive or to limit the invention to the precise form disclosed. They are chosen and described to explain the principles of the invention, its application and its practical use to enable others skilled in the art to utilize the invention.

Figure 1:
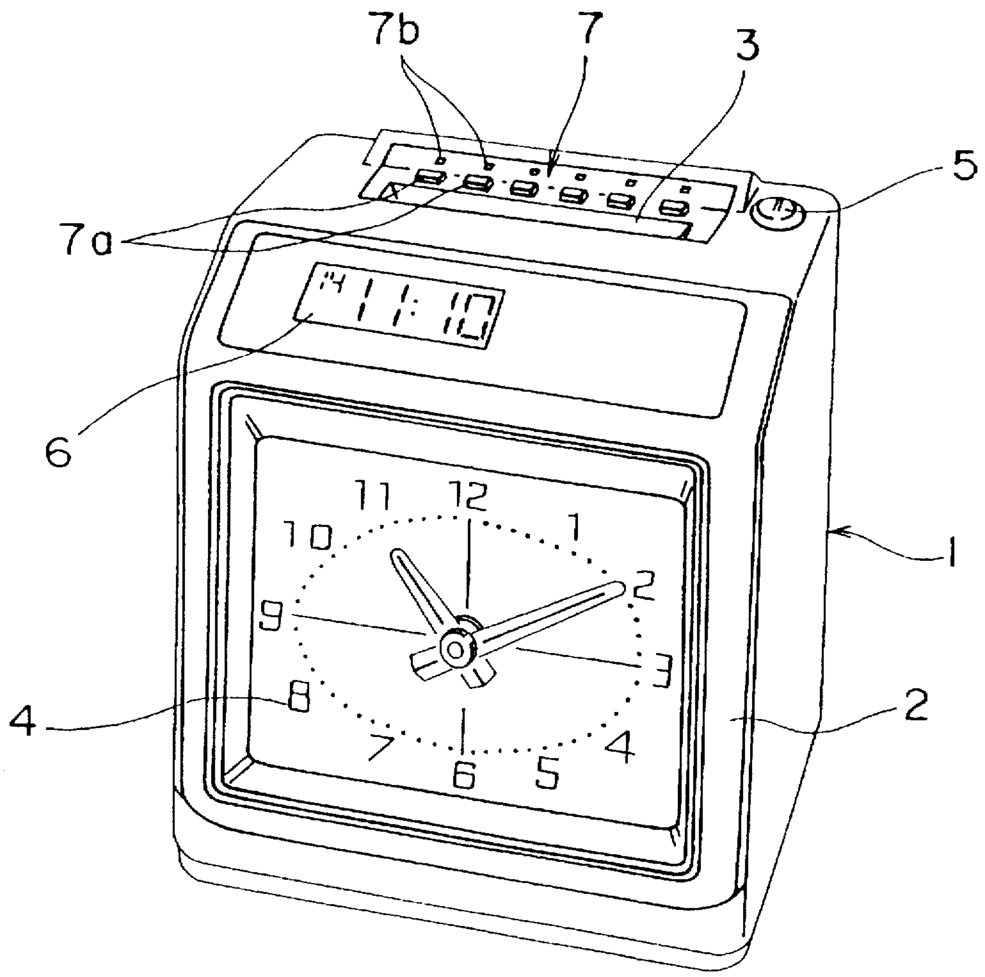
FIG. 1 is a perspective view showing an outer appearance of a time recorder equipped with a code judgment function, according to the present invention.
Figure 2:
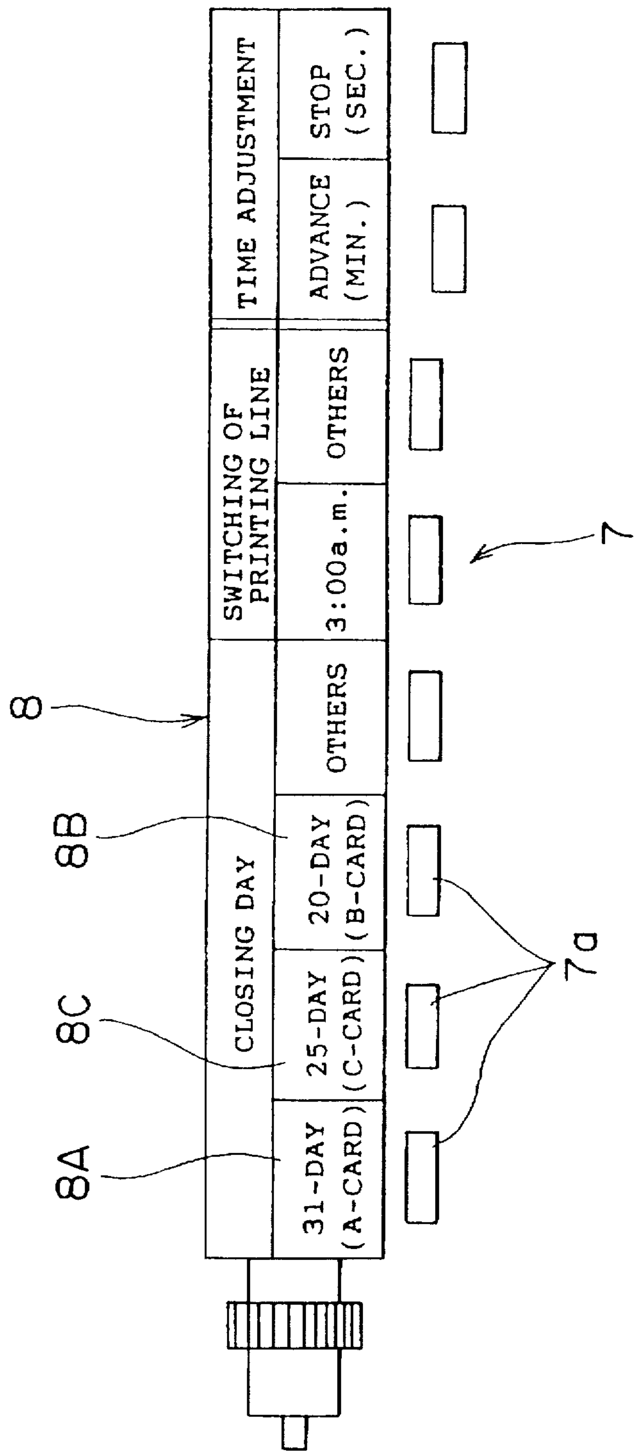
FIG. 2 is a plan view of a display panel used for modifying the function of a selection switch, which is disposed within the time recorder of FIG. 1.

FIG. 1 is a perspective view showing an outer appearance of a time recorder equipped with a code judgment function according to the present invention. In FIG. 1, reference numeral 1 denotes a recorder body; 2, an upper case which can be opened and closed relative to the record body 1; 3, an insertion slot for allowing a time card as later described to be inserted therein; 4, an analog type clock dial; 5, a selection key switch equipped with a totalization mode; 6, a crystal type digital display unit; 7, a keyboard including a plurality of selection switches *7a*; and *7b*, indication lamps each provided to the individual switches *7a*, respectively. When the time recorder is in use, those selection switches *7a* exhibit the function for determining a printing column. However, when the upper case 2 is opened, a display panel 8 indicating the card closing dates 8A, 8B, 8C, etc. of FIG. 2 appears in the recorder body 1 and the functions of the individual switches *7a* are automatically switched in accordance with the respective indications of the display panel 8. Accordingly, for newly establishing a closing date or dates on the time card or switching the closing date or dates from one to another, the selection switches *7a* are selectively turned on and the upper case 2 is closed again relative to the record body 1. By doing this, the time recorder processes time data in one mode of the card closing day or days newly established by the selection switch *7a*.

Figures 3, 4:
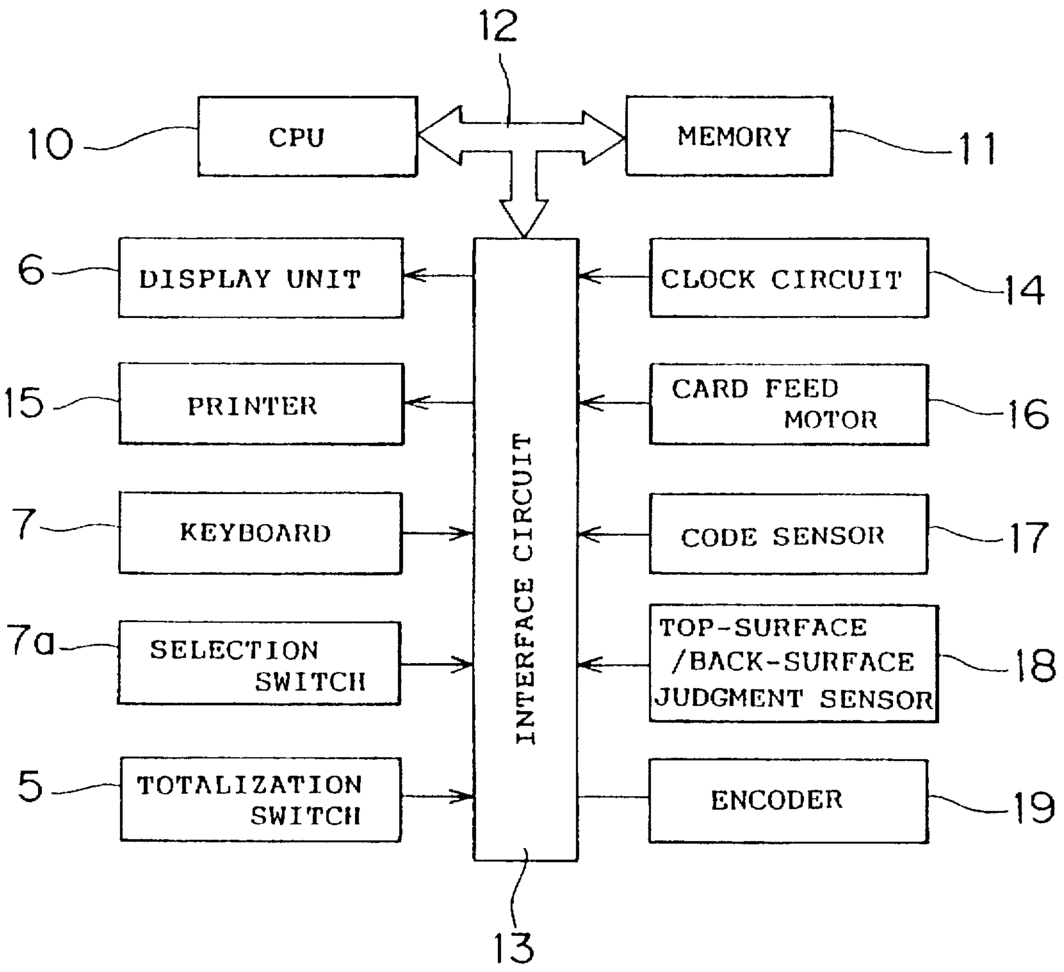
FIG. 3 is a block diagram showing an electrical construction of the time recorder of FIG. 1.
FIG. 4 is a job classification table, utilizing an empty column and a 31-day indication column.

FIG. 3 is a block diagram explaining the electrical construction of the time recorder described above. In FIG. 3, reference numeral 10 denotes a CPU (central processing unit) constituting the center of a control unit, and a reference numeral 11 denotes a memory including a ROM and a RAM. An interface circuit 13 is connected between the CPU 10 and the memory 11 through a bus 12. Connected to the interface circuit 13 are a clock circuit 14, a printer 15, a card feed motor 16, a code sensor 17 for reading various codes (marks) formed on the time card, a top-surface/back-surface judgment sensor 18 for judging a top-surface/back-surface of the time card, and an encoder 19 in addition to the selection switch (totalization switch) 5, the display unit 6, the keyboard 7 and the selection switches 7a all mentioned above. They are operated in accordance with a system program which is preliminarily stored in the memory 11.

Figure 5:
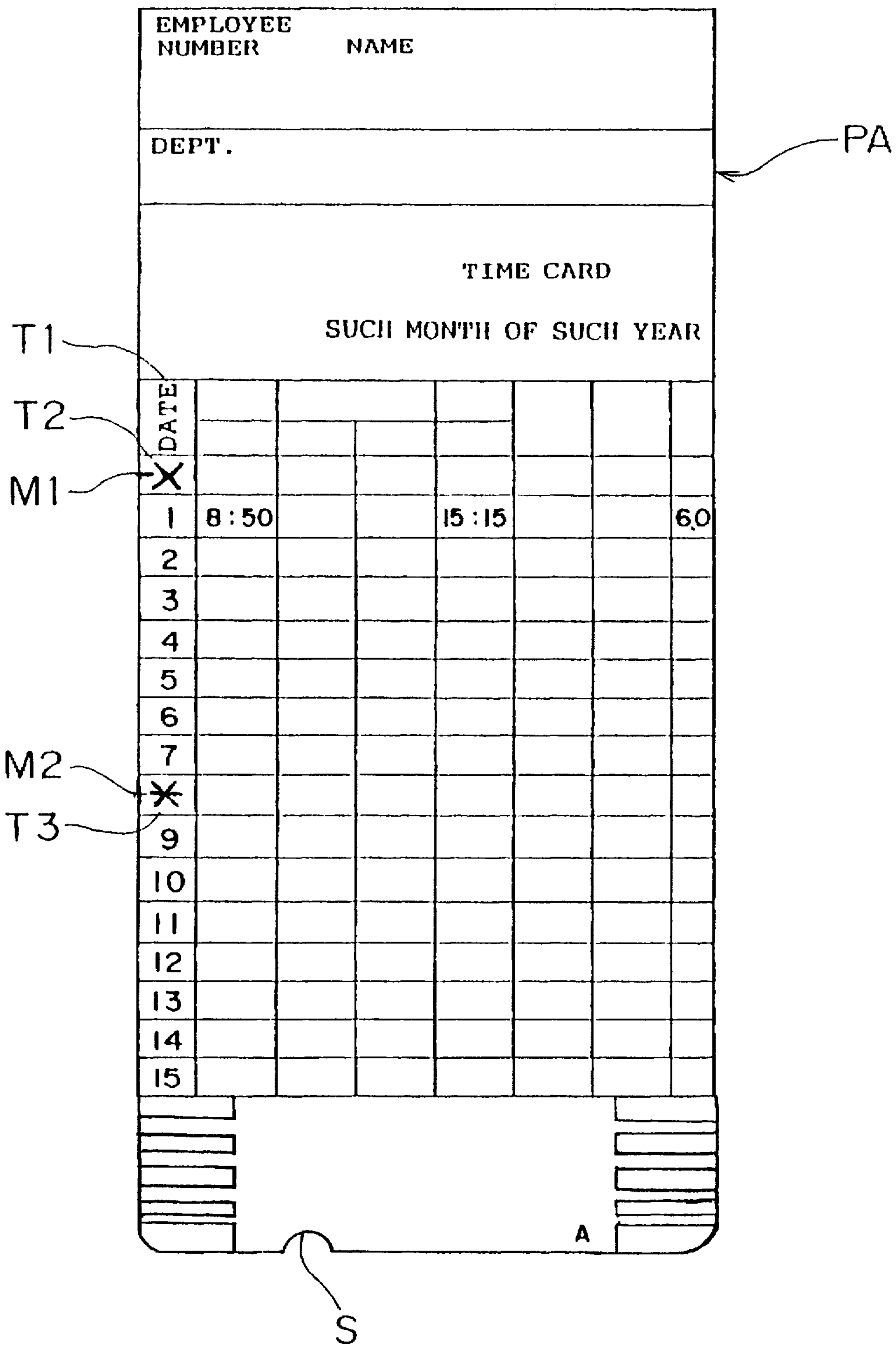
FIG. 5 is a top-surface view of a time card (A-card) on which codes are established according to the present invention.
Figure 6B:
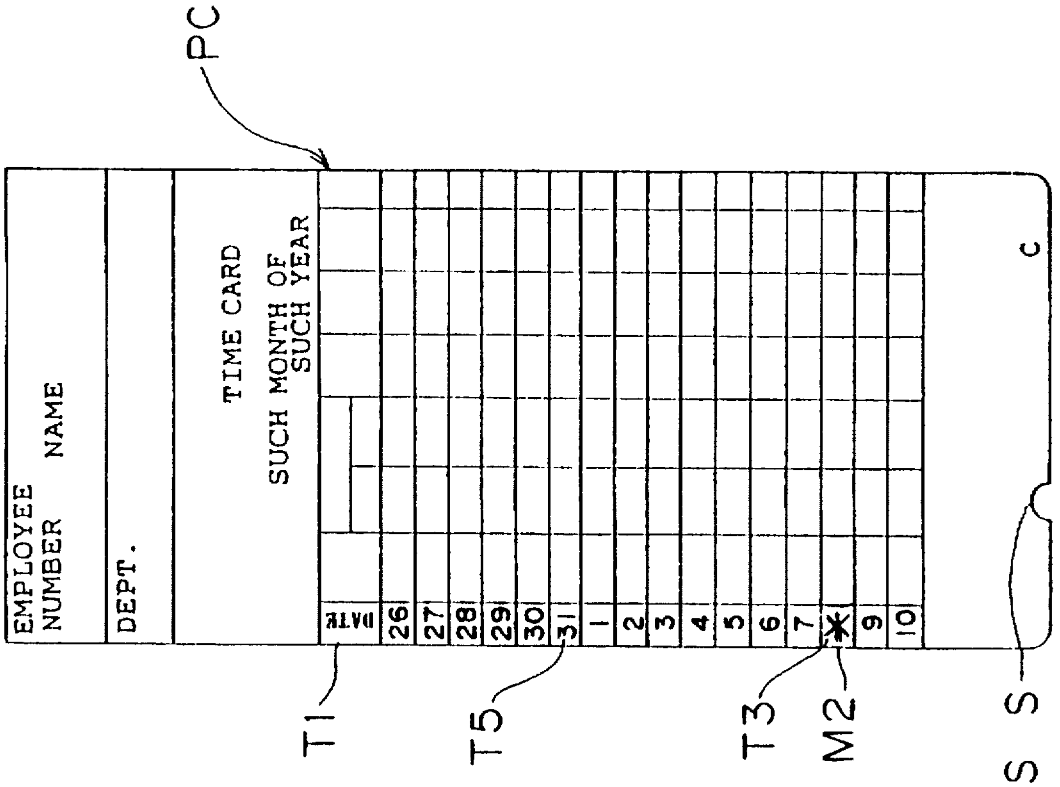
FIG. 6(B) is a top-surface view of a time card (C-card), with respect of which B-card and C-card codes are established according to the teaching of the present invention.
Figure 6A:
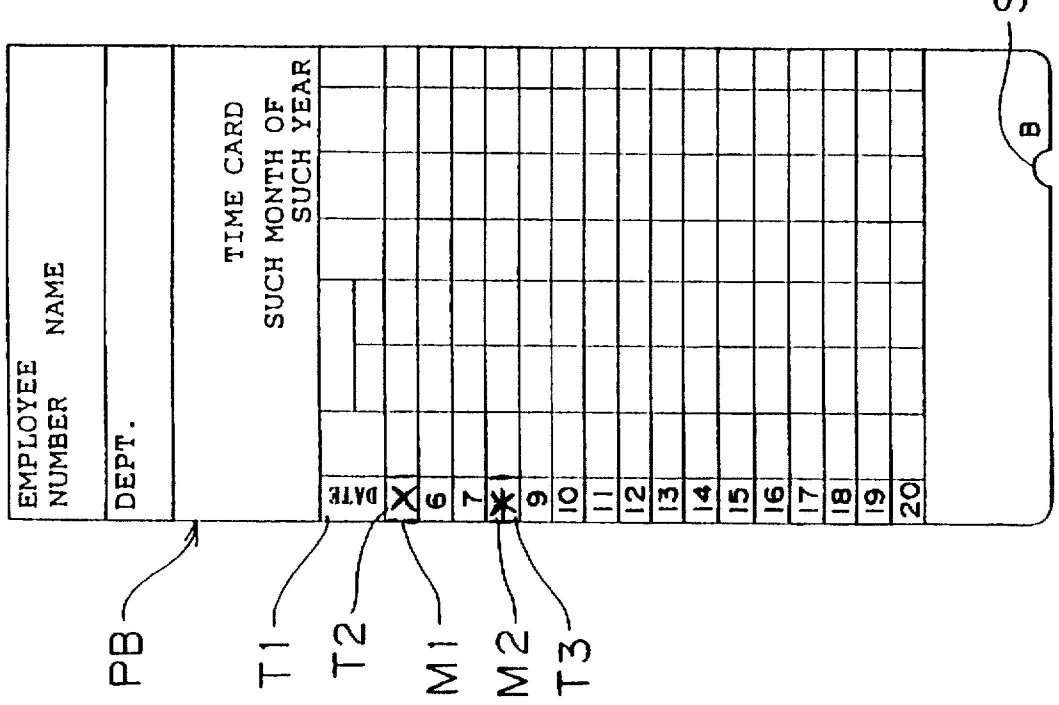
FIG. 6(A) is a back-surface view of a time card (B-card)

In FIG. 5, reference symbol PA denotes a time card which is usually called an A-card, in which the closing day is day 31 of the month. On the top-surface of this time card PA, printing columns for day 1 to day 15 of the month are formed, and on the back-surface thereof, printing columns of day 16 to day 31 of the month are formed. In FIG. 6(A), reference symbol PB denotes a time card which is usually called a B-card, in which the closing day is day 20 of the month. On the top-surface of this time card PB, printing columns for day 21 to day 5 of the month are formed, and on the back-surface thereof, a printing column for day 6 to day 20 of the month is formed. In FIG. 6(B), reference symbol PC denotes a time card which is usually called a C-card, in which the closing day is day 25 of the month. On the top-surface of this time card PC, printing columns for day 26 to day 10 are formed, and on the back-surface thereof, printing columns for day 11 to day 25 of the month are formed. In the case of the A-card PA, the uppermost column T2 of the date column T1 on the top-surface is, as shown in FIG. 5, an empty column. In the case of the B-card PB and C-card PC, the uppermost columns T2 of the date columns T1 on the back-surface are empty columns, respectively. Those empty columns are used as columns in which an identification mark Ml for determining the job classification of the card user is formed.

Figure 7B:
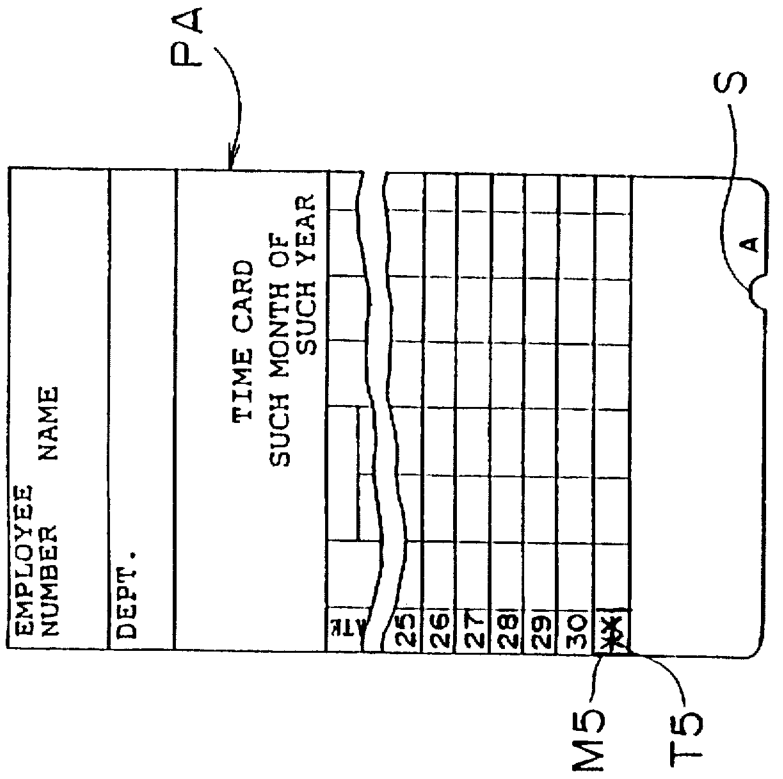
FIG. 7(B) is a back-surface view, partly cutaway, of a time card (A-card), in which a mark indicating a job classification is applied to 31-day indication column.

The column T5 indicating the day 31 of the month on each time card PA, PB, PC is used as a column in which the identification mark M5 for determining the job classification of the card user is formed as in the case with the uppermost column T2 of each card as shown in FIG. 7(B). Depending on whether or not the identification marks Ml and M5 exist in the uppermost column T2 and day 31 indication column T5, the job classification of the card user is determined as shown in the job classification table of FIG. 4. In FIGS. 5 and 6, reference symbol T3 denotes a day indication column in which the day (the numerical figure representing this day) is equal to the number of a predetermined ID code of the card user. Reference symbol M2 denotes a code read mark applied to this day indication column T3. In the illustrated examples, since the M2 mark is applied to the day 8 indication column, the ID code number of the card user is "8". In a case where the ID code has a number other than "8", the M2 mark is applied to the day indication column that has a number other than "8". Accordingly, the maximum number of the ID codes that can be determined in accordance with the present invention is thirty (30).

Figure 7A:
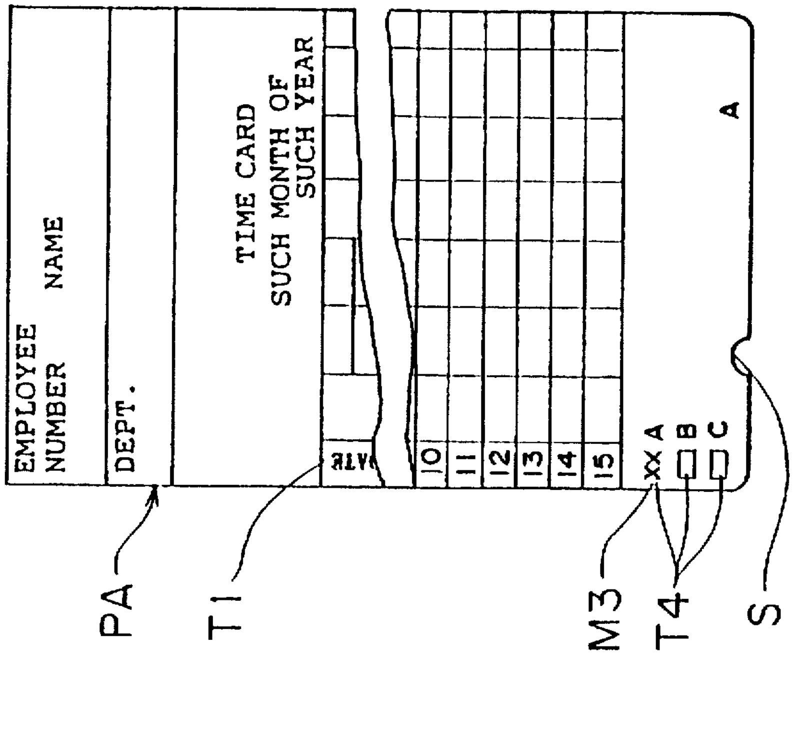
FIG. 7(A) is a top-surface view, partly cutaway, of a time card (A-card) in which the type of the time card is indicated by a mark.

In FIG. 7(A), reference symbol T4 denotes an indication column indicating the type of the time card (A-card, B-card, or C-card) which indication column is formed at a lower part of a time card. In the illustrated example, since an M3 mark is shown in the indication column on the A-card, this time card PA is judged by the time recorder as the A-card in which the closing date is day 31 of the month. However, since determination of the type of a time card is sometimes made by the selection switch *7a* as mentioned, such selection should be considered as optional.

A cut S formed in a lower edge of each time card PA to PC is used for judging the top-surface/back-surface of the time card. The above-mentioned top-surface/back-surface judgment sensor 18 detects this cut S in order to make a judgment whether or not the time card is inserted with its top-surface facing the front. If the cut S is formed in the left-hand side of the time card, it is judged that the time card is inserted with its topsurface facing the front, and if in the right-hand side, it is judged that the time card PA, PB, or PC is inserted with its back-surface facing the front.

The code sensor 17 detects the date column T1 on each time card PA to PC which is fed by a card feed motor 16, judges whether or not the identification mark M1 is entered in the uppermost column T2 and further judges whether or not the identification mark M5 is entered in the day 31 indication column T5 in order to have the CPU 10 of FIG. 3 determine the job classification of the card user. Likewise, the code sensor 17 detects the code read mark M2 in order to divide the date based on a feed amount of the time card by the card feed motor 16 in order to have the CPU 10 judge the ID code number of the card user based on the date. The time recorder calculates job data of the card user from the job classification and ID code thus judged and causes the printer 15 to print the results of the calculation in predetermined printing columns of each time card PA to PC. Such calculated job data can also be filed in a memory of each card user.

Figure 8:
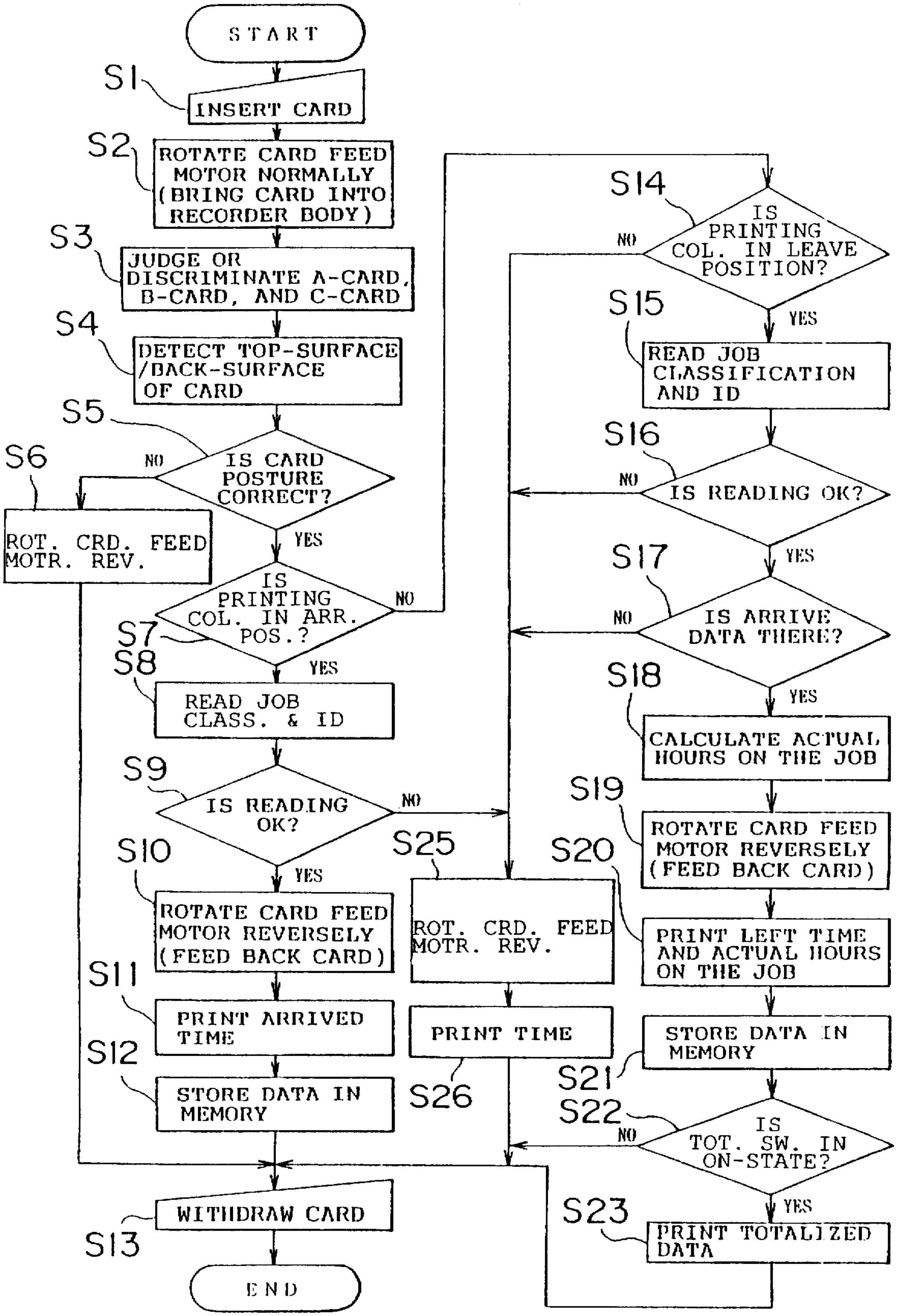
FIG. 8 is a flowchart showing the procedures of the time recorder according to the present invention.

Next, the procedure of the time recorder using the time card on which a code or codes are established in accordance with the teaching of the present invention will be described in detail with reference to the flowchart shown in FIG. 8.

First, in Step 1, one of the time cards PA to PC is inserted into the card insertion slot 3 formed in the recorder body 1. Then, in Step 2, the card feed motor 16 is rotated normally to bring the card into the recorder body 1, and in Step 3, the type of the card is judged by means of the reading operation of the type code M3 or the selection operation of the selection switch *7a*. In the next Step 4, the top-surface/back-surface of the time card PA, PB, or PC is judged and then the program proceeds to Step 5.

In the Step 5, it is judged whether or not the top-surface/back-surface of the time card inserted is coincident with the current date. If the judgment result is negative, the program proceeds to Step 6 where the card feed motor 16 is rotated reversely to immediately feed back the time card to the insertion slot 3 and the procedure is finished. It goes without saying that when, as mentioned, the insertion posture of the time card PA, PB, or PC is wrong, a warning sentence indicating the wrong insertion posture of the time card PA, PB, or PC is displayed in the display unit 6 in order to alert the card user.

If the judgment is made in the affirmative in the Step 5, the program proceeds to Step 7 where it is judged whether or not the position of the printing column which has been selected by the selection switch *7a* is in the "ARRIVE" position. If the judgment result is affirmative, the code sensor 17 makes a judgment as to whether or not the marks M1, M5 are entered, and the job classification and ID code of the card user are read by means of reading the mark M2. If a judgment of "reading OK" is made in the next Step 9, the program proceeds to Step 10 where the card feed motor 16 is rotated reversely to start the feed-back operation with respect to the time card PA, PB or PC. The program proceeds to the next Step 11 where the printer 15 is caused to print the arrived time in the printing column for the current day in the midway of the feed-back operation with respect to the time card PA, PB, or PC. Then, the program proceeds to Step 12 where this arrived time data is stored in a memory location of the card user. In the final Step 13, the time card PA, PB, or PC fed back to the insertion slot 3 is withdrawn and the procedure is finished.

On the other hand, if the judgment result in the Step 7 is negative, the program proceeds to Step 14 where it is judged whether or not the printing column is located in the "LEAVE" position. If the judgment result in Step 14 is negative again, the program proceeds to Step 25 where the time card PA, PB, or PC is fed back to the insertion slot 3. In the midway of the feed-back operation with respect to the time card PA, PB, or PC, the time printing is entered to the printing column of the current day in Step 26, and the program proceeds to Step 13.

If the judgment result in the Step 14 is affirmative, such procedures as reading of the job classification and ID code (Step 15), judgment as to whether or not reading is OK (Step 16), judgment as to whether or not the arrive data exists (Step 17), calculation of actual hours on the job (Step 18), feed-back of the time card (Step 19), printing of the left time and actual hours on the job (Step 20), storing data in the memory location of each card user (Step 21), judgment as to whether or not the totalization switch 5 is in the ON-state (Step 22), and printing of the totalized data (step 23) are executed, and the program proceeds to the Step 13. If the judgment results made in the Steps 16 and 17 are both negative, the procedures of the Steps 25 and 26 are executed. If the judgment result made in the Step 22 is negative, the program proceeds to Step 13 skipping the procedure of the Step 23.

Figure 9:
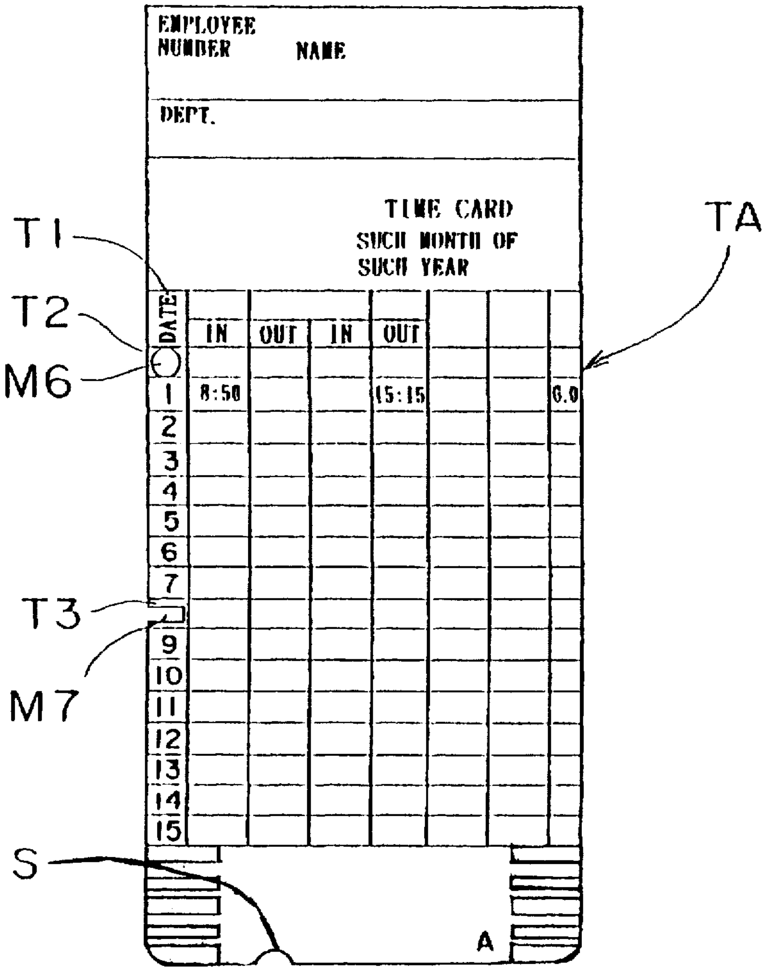
FIG. 9 is a top-surface view of a time card (A-card), in which marks are applied to the date column by punching and cutting.
Figure 10B:
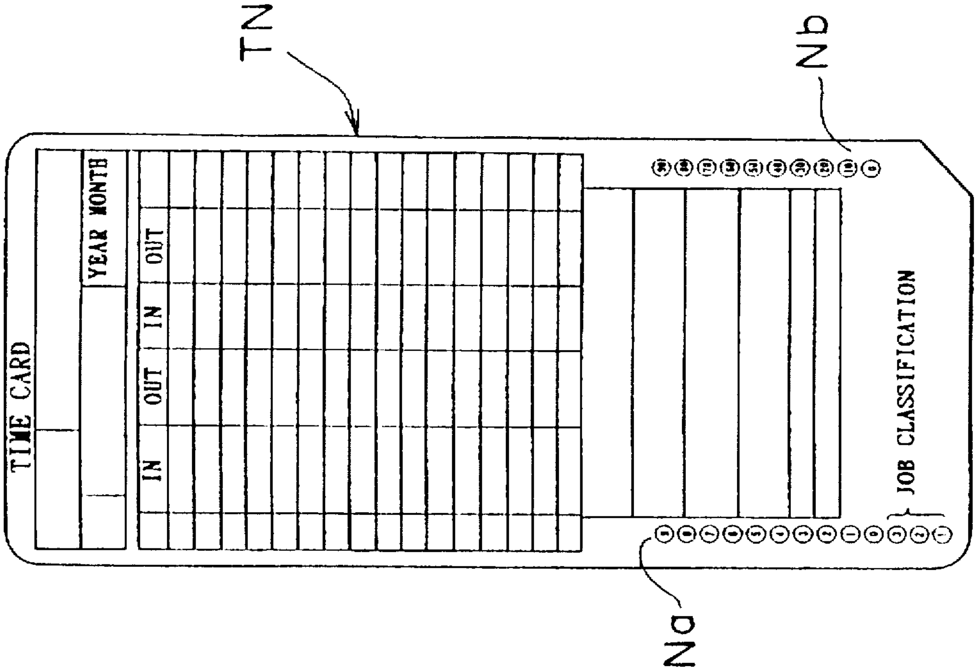
FIG.10(B) PRIOR ART
FIG. 10(A) and 10(B) are top-surface views of conventional time cards.
Figure 10A:
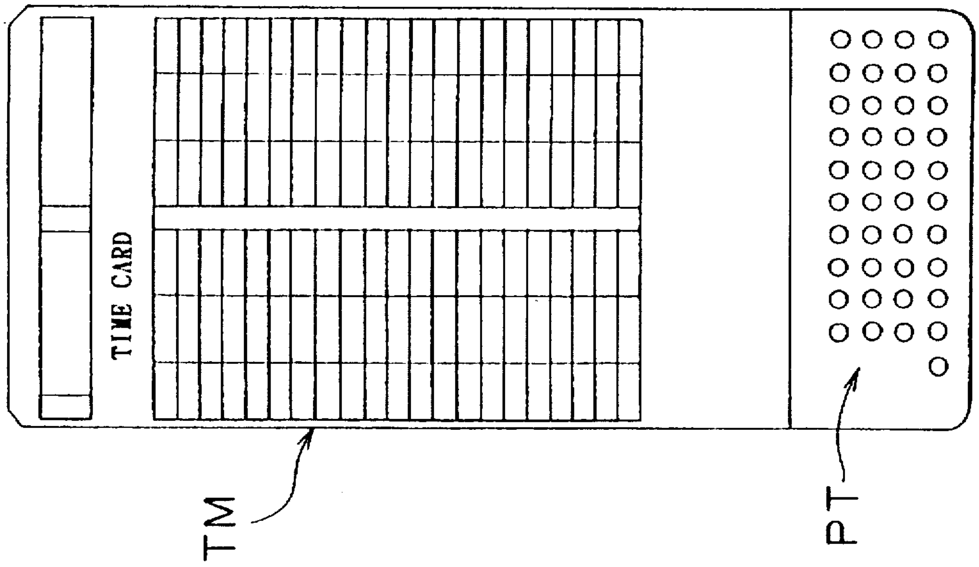
FIG.10(A) PRIOR ART

In the illustrated embodiments, the marks M1 to M5 are marked using a black marker. In the alternative, the marks M1 to M5 may be formed by a punch M6 or a cut M7 as shown in FIG. 9, or by other similar means. Selection of the marking means is optional.

As described in the foregoing, if the job classification and ID code are established in the date column on a time card in accordance with the method for establishing a code according to the present invention, it is no longer necessary to form a preparation column used exclusively for establishing a code on the time card. Accordingly, it becomes possible to make a larger printing column or provide a new printing column effectively utilizing the limited area on the time card. Also, in the case where a mark is entered to each column of the date column, a mark can be formed using a black marker or a simple punching machine and without the need of an exclusive punching machine which has a complicated structure. Accordingly, the cost for making the time card can be extensively reduced. Furthermore, since the job classification and ID code can be read by a single code sensor and since time cards having different closing days can be processed by a single time recorder, the time recorder can be extensively simplified in structure. Therefore, the time recorder according to the present invention is suitable to be used in small to medium sized companies, offices, or the like which have of less than thirty workers.

Although this invention has been described in its preferred form with a certain degree of particularity, it is understood that the present disclosure of the preferred form has been made only by way of example and that numerous changes in the details of construction and arrangement of parts may be resorted to without departing from the spirit and the scope of the invention as hereinafter claimed.

What is claim is:

1. A method of establishing a user identification code on a time card having numerical figures representing dates printed in a date column on the time card, said time card being used by a user having an assigned user identification code number, said method comprising:

(a) selecting a day among said dates printed in said date column, said day having a numerical figure which is equal to said user identification code number assigned to the user; and (b) forming said user identification code number on the card by applying a code read mark in said date column at a position corresponding to said day selected in step (a), said code read mark signifying that the numerical figure of the day selected in step (a) represents the user identification code number of the user, whereby said user identification code number of the user is formed on the card by said code read mark and said numerical figure corresponding to the day selected in step (a).

2. A method of establishing a job classification code on a time card having numerical figures representing dates printed in a date indication column on the card, said card being used by a user having an assigned job classification code, said method comprising:

(a) utilizing one of an empty column or a date indication column as an identification mark preparing column in which an identification mark may optionally be formed; and (b) providing an indication of the job classification code of the user by either (i) forming said identification mark in said identification mark preparing column to signify a first job classification code assigned to the user or (ii) not forming said identification mark in said identification mark preparing column to signify a second job classification code corresponding to the user.

3. A method as in claim 2, wherein said first job classification code signifies a part-time worker and said second job classification code signifies a full-time worker.

* * * * *